United States Patent Office 3,370,919
Patented Feb. 27, 1968

3,370,919
PRODUCTION OF HYDROGEN CYANIDE
Bingham Y. K. Pan, Texas City, Tex., assignor to Monsanto Company, St. Louis, Mo., a corporation of Delaware
Filed Feb. 23, 1965, Ser. No. 434,191
6 Claims. (Cl. 23—151)

ABSTRACT OF THE DISCLOSURE

The method of controlling the yield of hydrogen cyanide produced by the reaction of a hydrocarbon, a nitrogen-containing gas, and an oxygen-containing gas in the presence of a Group VIII metal catalyst by measurement of the reaction or flame temperature for any given ratio of the oxygen-containing gas to the sum of the hydrocarbon and nitrogen-containing gas and adjustment of the ratio of the hydrocarbon to the nitrogen-containing gas to obtain a minimum reaction or flame temperature.

---

Figure 1:
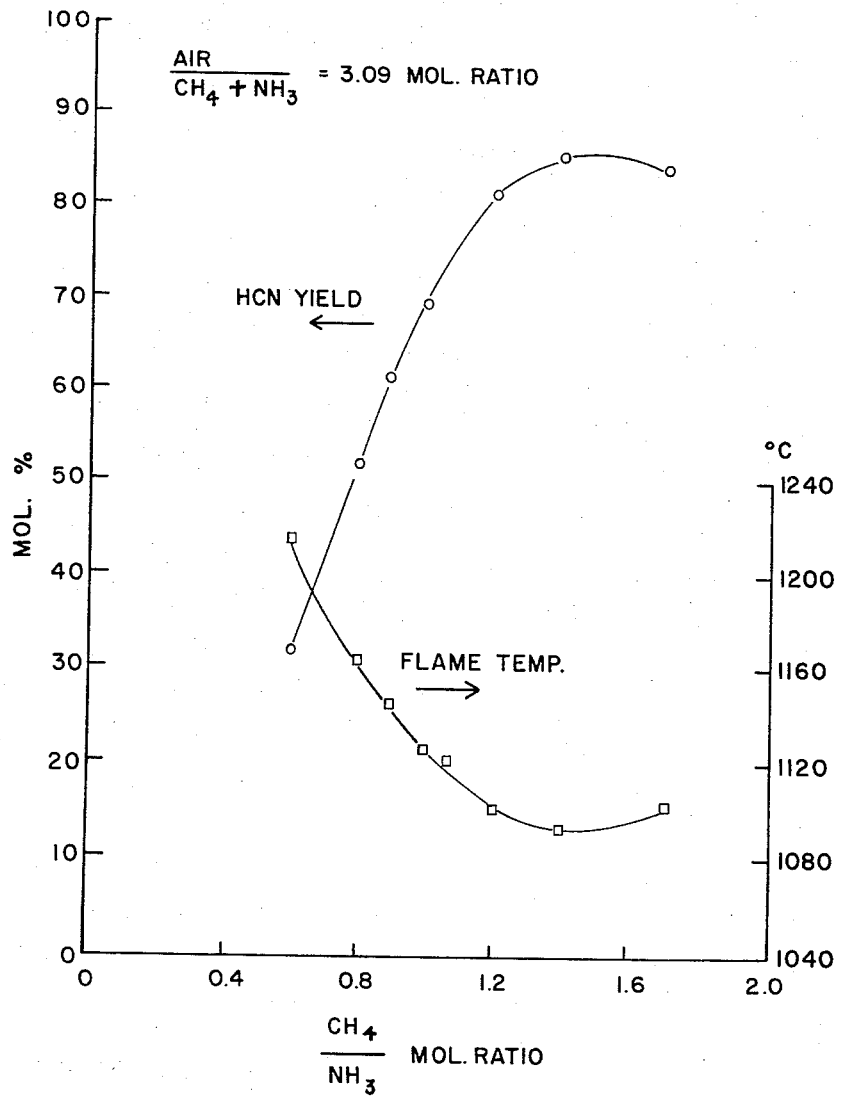

The present invention relates to an improvement in the process for the production of hydrogen cyanide (HCN). More particularly, it relates to an improvement in the process for producing hydrogen cyanide by the vapor-phase reaction of ammonia, natural gas and air over a catalyst such as platinum metal or a platinum metal alloy at high temperatures.

Among the methods presently known for the preparation of HCN, the most widely accepted ones are those in which a hydrocarbon, a nitrogen-containing gas, and an oxygen-containing gas are reacted in the presence of a metallic catalyst. Of these, the commercial process offering the most advantages is that in which the reactants are ammonia, natural gas and air. The catalyst generally employed in this process is one comprised of some form of platinum or its alloys. The metallic catalyst is employed either as a coating on various substrates or in supported form as plates, spirals, woven wire, and the like.

It is well known that in the reaction of ammonia, natural gas and air to produce HCN, one of the most important variables with respect to HCN yield and conversion is the composition of the feed gas. While any two ratios of the reactants can fix the feed gas composition, various combinations of these ratios can and have been employed such as (1) 

(2) 

(3) 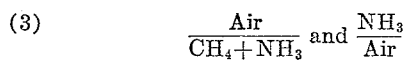

either on a weight or a volume basis. A wide variety of such feed ratios can be used but for maximum HCN production the air to ammonia and methane ratio should be large enough to supply the energy for HCN formation but not so large as to cause unnecessary decomposition of methane and ammonia. Optimum ratios vary depending upon operating conditions such as throughput, catalyst type, reactor geometry, etc. Hence, this ratio needs to be determined and regulated periodically so as to assure maximum productivity and yield.

In current practice, control of the reaction by the setting of desirable feed ratios is effected by means of chemical analyses. A feed ratio to the reactor is set, the reactor is allowed to come to steady-state conditions and the feed gas and off-gas are sampled. The samples are analyzed and the corresponding reactor performance is evaluated based on the analyses. The time required for such yield tests is several hours and a large number of tests are needed to define the optimum conditions for economic and/or capacity reasons. The need for a simpler technique that can be used to establish optimum feed ratios for any set of operating conditions is readily apparent.

It is an object of the present invention, therefore, to provide a simple, economical rapid and efficient method for controlling the operation of an HCN converter to maintain yield or conversion at an optimum level. Other objects and advantages of the invention will be apparent from a consideration of the following description and the appended claims.

It has now been discovered that there is a fundamental relationship between the optimum feed ratio to the reactor and the reaction or flame temperature and/or the off-gas temperature of the reaction and that this relationship provides the basis for a simple and practical method of controlling the feed ratio to maintain HCN production at the optimum level. According to the invention, control of the reaction of methane, ammonia and air to produce HCN is effected by measuring the reaction or flame temperature and/or off-gas temperature produced at a given

ratio and adjusting the $CH_4/NH_3$ ratio until a minimum reaction or flame temperature and/or a minimum off-gas temperature is obtained. Yield of HCN is maximized at the minimum reaction of flame temperature while conversion of HCN is maximized at the minimum off-gas temperature.

The invention is illustrated in the following examples which, however, are not to be construed as limiting it in any manner whatsoever.

EXAMPLE 1

The apparatus employed was a scale model of a conventional reaction system employed in the industrial production of hydrogen cyanide. It consisted essentially of a feed gas manifold, a reactor or converter and a heat exchanger attached directly below the reactor. The reactor, a vertical tube 4 inches in diameter, contained 2 packs of wire gauze made of a platinum-rhodium alloy containing 90% platinum and 10% rhodium cut in a circular shape and supported on alumina bars. Each pack consisted of three layers of the 80-mesh, 3-mil gauze. Air was charged through a calibrated rotameter at a constant rate to provide an

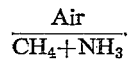.

molar ratio of 3.09 while ammonia and natural gas were charged through calibrated rotameters at rates to provide varying $CH_4/NH_3$ molar ratios. The resulting gas mixture was passed through the catalyst in the reactor at a rate of about 100 lb./hr. and a pressure of about 14 p.s.i.g. The composition of the natural gas varied slightly but averaged in mole percent about 93.5% methane, 3.9% ethane, 0.7% propane, 0.2% butane and 1.7% carbon dioxide.

The reaction was initiated by contacting the catalyst with a platinum loop igniter heated electrically. Reaction or flame temperature was measured by means of an optical pyrometer while off-gas temperature was measured by a thermocouple located at about one inch from the exit of the gases from the catalyst bed. After the reactor had reached steady-state conditions, the reactor off-gas was quenched immediately in the heat exchanger and samples were collected and analyzed for HCN and $NH_3$ content by standard chemical titration with silver nitrate and HCl, respectively.

Figure 2:
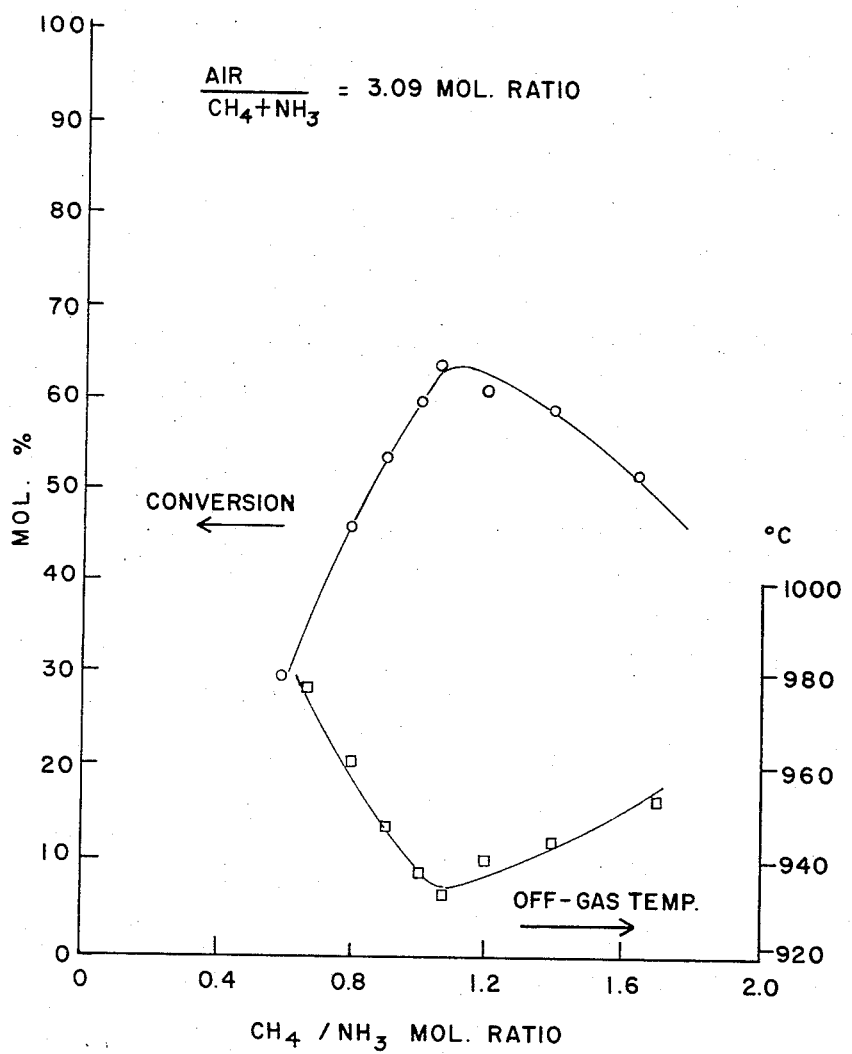

Results are plotted in FIGURES 1 and 2. From FIGURE 1, it will be seen that at the

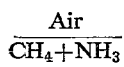

molar ratio employed, the lowest flame temperature in the reaction pinpoints the $CH_4/NH_3$ molar ratio which will provide the maximum yield of HCN, yield being defined as $$\frac{HCN}{(NH_3)_{in} - (NH_3)_{out}} \times 100$$

Similarly, FIGURE 2 shows that maximum HCN conversion is obtained at the $CH_4/NH_3$ molar ratio which results in the lowest off-gas temperature, conversion being defined as $$\frac{HCN}{(NH_3)_{in}} \times 100$$

EXAMPLE 2

The reactor of Example 1 was operated following the same procedure employed in that example using an

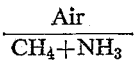

molar ratio of 3.25 and various $CH_4/NH_3$ molar ratios. Throughput of the reactant mixture averaged about 104 lb./hr. Results are presented in Table I below.

TABLE I

| $CH_4/NH_3$, Molar Ratio | Temp., °C. Flame | Temp., °C. Off-Gas | Yield, Mole percent | Conversion, Mole percent |
|---|---|---|---|---|
| 0.7 | 1,218 | 982 | | |
| 0.9 | 1,182 | 978 | 56.48 | 50.34 |
| 1.1 | 1,140 | 958 | 72.36 | 63.86 |
| 1.25 | 1,127 | 947 | 83.74 | 70.83 |
| 1.4 | 1,122 | 950 | 86.33 | 63.20 |
| 1.55 | 1,117 | 953 | 87.83 | 60.37 |
| 1.7 | 1,125 | 960 | 86.77 | 59.33 |

EXAMPLE 3

The results in Table II below were obtained by operation of the HCN reactor as described in Example 1 with an

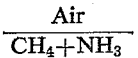

molar ratio of 2.94 and varying $CH_4/NH_3$ molar ratios.

TABLE II

| $CH_4/NH_3$, Molar Ratio | Temp., °C. Flame | Temp., °C. Off-Gas | Yield, Mole percent | Conversion, Mole percent |
|---|---|---|---|---|
| 0.7 | 1,135 | 945 | 54.24 | 47.07 |
| 0.9 | 1,098 | 922 | 75.15 | 61.39 |
| 1.0 | 1,088 | 920 | 80.59 | 63.60 |
| 1.1 | 1,085 | 926 | 82.41 | 60.51 |
| 1.25 | 1,084 | 936 | 84.49 | 54.82 |
| 1.4 | 1,092 | 940 | 83.59 | 50.11 |
| 1.7 | 1,097 | 950 | 81.80 | 52.07 |

EXAMPLE 4

The experiment of Example 1 was again repeated using an

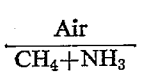

molar ratio of 2.80 and varying $CH_4/NH_3$ molar ratios. Results are presented in Table III below.

TABLE III

| $CH_4/NH_3$, Molar Ratio | Temp., °C. Flame | Temp., °C. Off-Gas | Yield, Mole percent | Conversion, Mole percent |
|---|---|---|---|---|
| 0.7 | 1,100 | 924 | 57.45 | 49.66 |
| 0.9 | 1,080 | 910 | 78.19 | 63.14 |
| 1.1 | 1,071 | 924 | 83.19 | 56.91 |
| 1.4 | 1,084 | 936 | 82.17 | 46.99 |
| 1.7 | 1,090 | 945 | 81.96 | 39.45 |

A study of the foregoing data clearly establishes that for a constant air to fuel

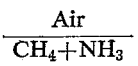

molar ratio and varying $CH_4/NH_3$ molar ratios, the maximum HCN yield occurs at the minimum flame or reaction temperature and the maximum HCN conversion occurs at the minimum off-gas temperature. Thus, it is possible to control the operation of an HCN converter at maximum performance by merely measuring the flame and/or off-gas temperature at a fixed molar ratio of air to combined methane and ammonia, and varying methane to ammonia molar ratios until the lowest flame temperature or the lowest off-gas temperature is obtained, depending upon whether control is to be effected on the basis of HCN yield or conversion to HCN, and adjusting the methane and ammonia flows to maintain that ratio. This control can be effected automatically if desired by means of conventional temperature sensing devices and connected flow controllers by signals from the sensing devices. Such a method is more accurate and faster than conventional chemical analyses. An experienced operator, for example, using an optical pyrometer for flame temperature measurement can make such measurements in only a fraction of a minute and with only a deviation of ±3°C. in the neighborhood of 1000° C. In this method, too, only $CH_4$ and $NH_3$ values are varied, the air setting in the flow recorder and control being maintained constant thus eliminating a frequent source of error resulting from air flow in the system. The control method of the invention is more economical than known methods because fewer yield tests are required and the converter can always be operated at peak performance regardless of demand for HCN. In addition, the method is not only simpler and faster but it facilitates rapid correction of errors or deviations in feed gas flows.

The invention is not to be considered as limited to the exact mode of operation of an HCN process set out in the examples. For instance, the so-called platinum catalyst employed in the process can be any one of the Group VIII metals, i.e., platinum, rhodium, iridium, palladium, osmium, or ruthenium or any mixture or alloy of two or more of the metals. These catalysts may be employed in the form of sheets, wires, turnings, cte., as well as in the preferred form of one or more layers of a fine wire gauze. The metals may also be used in the form of coatings on various inert substrates such as beryl, alumina, sillimanite, etc. Likewise, many and varied types of supports made of a variety of materials can be employed for the preferred gauze catalysts.

What is claimed is:

1. In the manufacture of hydrogen cyanide by the reaction of a hydrocarbon, a nitrogen-containing gas, and an oxygen-containing gas in the presence of a Group VIII metal catalyst, the method of controlling the yield of hydrogen cyanide at an optimum level which comprises measuring the reaction or flame temperature for any given ratio of the oxygen-containing gas to the sum of the hydrocarbon and the nitrogen-containing gas and adjusting the ratio of the hydrocarbon to the nitrogen-containing gas to obtain a minimum reaction or flame temperature.

2. In the manufacture of hydrogen cyanide by the reaction of a hydrocarbon, a nitrogen-containing gas, and an oxygen-containing gas in the presence of a Group VIII metal catalyst, the method of controlling the conversion to hydrogen cyanide at an optimum level which comprises measuring the off-gas temperature for a given ratio of the oxygen-containing gas to the sum of the hydrocarbon and the nitrogen-containing gas and adjusting the ratio of the hydrocarbon to the nitrogen-containing gas to obtain a minimum off-gas temperature.

3. In the manufacture of hydrogen cyanide by the reaction of methane, ammonia, and air in the presence of a platinum-containing gauze catalyst, the method of controlling the yield of hydrogen cyanide at an optimum level which comprises measuring the reaction or flame temperature for a given ratio of air to the sum of methane and ammonia and adjusting the ratio of methane to ammonia to obtain a minimum reaction or flame temperature.

4. The process of claim 3 wherein said platinum-containing catalyst is an alloy consisting of about 90 percent platinum and 10 percent rhodium.

5. In the manufacture of hydrogen cyanide by the reaction of methane, ammonia, and air in the presence of a platinum-containing gauze catalyst, the method of controlling conversion to hydrogen cyanide at an optimum level which comprises measuring the off-gas temperature for any given ratio of air to the sum of methane and ammonia and adjusting the ratio of methane to ammonia to obtain a minimum off-gas temperature.

6. The process of claim 5 wherein said catalyst is an alloy containing about 90 percent platinum and 10 percent rhodium.

References Cited

FOREIGN PATENTS 956,200   4/1964   Great Britain.

MILTON WEISSMAN, *Primary Examiner.*

OSCAR R. VERTIZ, *Examiner.*

H. S. MILLER, *Assistant Examiner.*

UNITED STATES PATENT OFFICE
CERTIFICATE OF CORRECTION

Patent No. 3,370,919                          February 27, 1968

Bingham Y. K. Pan

It is hereby certified that error appears in the above numbered patent requiring correction and that the said Letters Patent should read as corrected below.

Column 2, line 30, for "of" read -- or --; column 3, TABLE II, fifth column, line 7 thereof, for "52.07" read -- 42.07 --; column 4, line 45, for "cte." read -- etc. --.

Signed and sealed this 29th day of April 1969.

(SEAL)
Attest:

Edward M. Fletcher, Jr.                          EDWARD J. BRENNER

Attesting Officer                                Commissioner of Patents